US008576787B2

(12) United States Patent
Hooli et al.

(10) Patent No.: US 8,576,787 B2
(45) Date of Patent: Nov. 5, 2013

(54) SCHEDULING REQUEST TRANSMISSION SUPPORTING HIGH DOPPLER

(75) Inventors: Kari Juhani Hooli, Oulu (FI); Kari Pekka Pajukoski, Oulu (FI); Esa Tapani Tiirola, Kempele (FI)

(73) Assignee: Nokia Siemens Network Oy, Espoo (FI)

( * ) Notice: Subject to any disclaimer, the term of this patent is extended or adjusted under 35 U.S.C. 154(b) by 635 days.

(21) Appl. No.: 12/733,166

(22) PCT Filed: Aug. 12, 2008

(86) PCT No.: PCT/EP2008/060589
§ 371 (c)(1),
(2), (4) Date: Feb. 16, 2010

(87) PCT Pub. No.: WO2009/021952
PCT Pub. Date: Feb. 19, 2009

(65) Prior Publication Data
US 2010/0142474 A1    Jun. 10, 2010

Related U.S. Application Data

(60) Provisional application No. 60/955,998, filed on Aug. 15, 2007.

(51) Int. Cl.
*H04W 4/00* (2009.01)

(52) U.S. Cl.
USPC ............................ 370/329; 370/479; 375/130

(58) Field of Classification Search
USPC .................... 370/329, 203; 375/260, 206
See application file for complete search history.

(56) References Cited

U.S. PATENT DOCUMENTS

| 5,991,333 A * | 11/1999 | Rice .............................. 375/130 |
| 2003/0147343 A1 | 8/2003 | Onggosanusi et al. |
| 2007/0183386 A1 | 8/2007 | Muharemovic et al. |
| 2008/0298488 A1 * | 12/2008 | Shen et al. ..................... 375/260 |

FOREIGN PATENT DOCUMENTS

| JP | 2004-253899 | 9/2004 |
| RU | 2 297 731 C2 | 4/2007 |
| WO | 03/026147 | 3/2003 |
| WO | 2005/099194 | 10/2005 |

OTHER PUBLICATIONS

3GPP TR 25.913 V7.3.0, "Technical Specification Group Radio Access Network; Requirements for Evolved UTRA (E-UTRA) and Evolved UTRAN (E-UTRAN)", (Release 7), Mar. 2006, 18 pages.

(Continued)

*Primary Examiner* — Kevin C Harper
*Assistant Examiner* — Henry Baron
(74) *Attorney, Agent, or Firm* — Staas & Halsey LLP (57) ABSTRACT

Block spreading generating partial orthogonality is applied for the uplink control channel for E-UTRA. For instance, a problem of maximizing the multiplexing capacity leads to numerology causing odd-length sequences which do not have the favorable property of even-length sequences (partial orthogonality). The consequence of this is poor performance in cases of high Doppler effects. Maximal multiplexing capacity is taught without loss of performance at high Doppler by modifying an earlier scheduling request scheme. The earlier SR multiplexing scheme has a number of parallel SR resources per slot equal to 12*7=84. In one example, the spreading factor of block spreading is changed to an even number, e.g., from 7 to 6. This enables usage of the partial orthogonality properties of CAZAC sequences and as a result inter-code interference in the case of high Doppler is reduced. Other ways to generate partial orthogonality are shown with similar results.

48 Claims, 7 Drawing Sheets

(56) References Cited

OTHER PUBLICATIONS

3GPP TSG RAN WG1 #49bis, R1-073012, "Multiplexing capability of CDM based Dedicated Scheduling Request", Jun. 2007, Orlando, USA, 4 pages.
3GPP TSG RAN WG1 #50, R1-073654, "Scheduling Request supporting High Doppler", Aug. 2007, Athens, Greece, 6 pages.
3GPP TSG RAN WG1 #47bis, R1-070521, "CDMA based Multiplexing of ACK/NACK and CQI Control Information in E-UTRA Uplink", Jan. 2007, Sorrento, Italy, 4 pages.
3GPP TSG RAN WG2 #47bis, R1-070471, "Scheduling Request in E-UTRAN", Jan. 2007, Sorrento, Italy, 11 pages.
3GPP TSG RAN WG1 #49bis, R1-073016, "Uplink Scheduling Request for LTE", Jun. 2007, Orlando, USA, 3 pages.
3GPP TSG RAN WG1 #49, R1-072307, "Uplink Scheduling Request for LTE" May 2007, Kobe, Japan, 2 pages.
3GPP TSG RAN WG1 Meeting #47bis, R1-070379, "Multiplexing for Dedicated Resource Request", Jan. 2007, Sorrento, Italy, 3 pages.
KDDI, NTT DoCoMo: R1-072480, "CDMA based Multiplexing of ACK/NACK and CQI Control Information in E-UTRA Uplink," 3GPP TSG RAN WG1, Meeting #49, May 7-11, 2007, 3 Pages.
Russian Office Action for related Russian Patent Application No. 2010109362/07, issued on Apr. 20, 2012.
Chinese Office Action for related Chinese Patent Application No. 200880111539.7, issued on May 11, 2012.
3GPP TSG RAN WG1 #47, R1-063361, "CDM Multiplexing of Synchronous RACH," Nov. 6-10, 2006, 5 pages.
3GPP TSG-RAN-WG1 Meeting #49bis, R1-072895, "Multiplexing of Scheduling Request Indicator," Jun. 25-29, 2007, 4 pages.
"CDMA based Multiplexing of ACK/NACK and CQI Control Information in E-UTRA Uplink", R1-072480, 3GPP TSG RAN WG1 Meeting #49, Kobe, Japan, May 7-11, 2007, pp. 1-3.

\* cited by examiner

SCHEDULING REQUEST TRANSMISSION SUPPORTING HIGH DOPPLER

CROSS REFERENCE TO RELATED APPLICATIONS

This application is based on and hereby claims priority to PCT Application No. PCT/EP2008/060589 filed on Aug. 12, 2008 and U.S. Provisional Application No. 60/955,998 filed on Aug. 15, 2007, the contents of which are hereby incorporated by reference.

BACKGROUND

1. Technical Field

The invention relates to mobile communications and, more particularly, to better supporting communication with mobile devices in motion at high speed.

2. Discussion of Related Art

The following discussion refers specifically to developments underway in the uplink (UL) part of the Third Generation Partnership Program (3GPP) Universal Terrestrial Radio Access Network (UTRAN) long term evolution (LTE) often referred as 3.9G but is not limited to that context.

In 3G LTE there is a need for a scheduling request (SR) channel for the uplink (UL) to be defined and, more specifically, a method is needed for SR transmission applicable for high User Equipment (UE) velocities. A scheduling request is used to indicate that the UE has some data to transmit towards the network side.

It has been agreed in the RAN1#47bis meeting in Sorrento that a non-contention based scheduling request (SR) mechanism for time synchronized users is to be supported.

Figure 1:
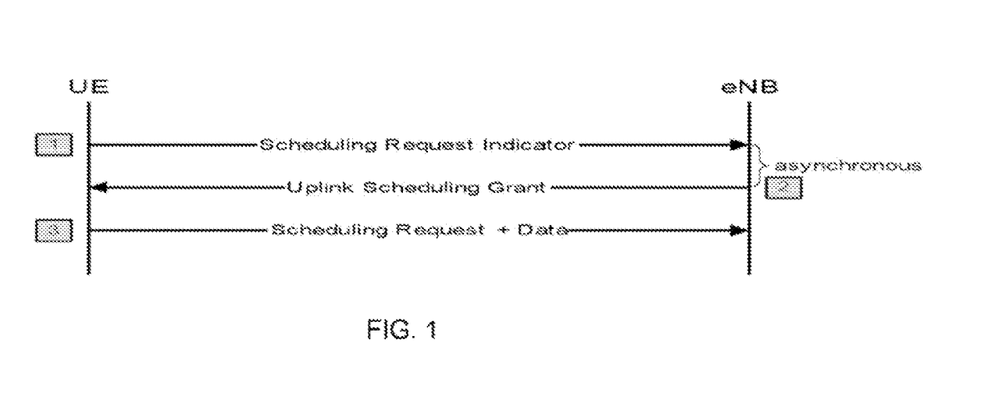
FIG. 1 shows a scheduling request procedure.

FIG. 1 shows a transmission of an asynchronous scheduling request indicator message 1 from the UE to the base station where the UE does not yet have an uplink data assignment and a scheduling grant message 2 is shown being sent back. On the other hand, if the UE already has an uplink data assignment, it is in the stage 3 of FIG. 1 and new scheduling requests are transmitted in-band (Scheduling Request+Data).

Figure 2:
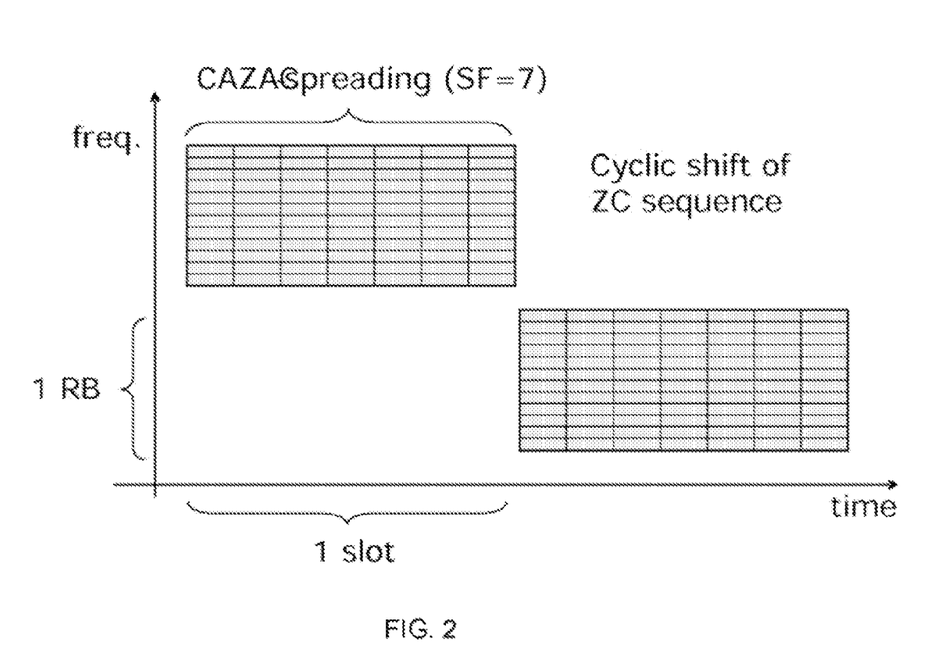
FIG. 2 shows a proposed structure of scheduling request transmission.

A multiplexing scheme for the SR is presented in Document R1-072307, "Uplink Scheduling Request for LTE" 3GPP TSG RAN WG1#49, Kobe, Japan, May 7-11, 2007, Nokia Siemens Networks, Nokia, as shown in FIG. 2 hereof where we proposed the combination of block-spreading and CAZAC (Constant Amplitude Zero Autocorrelation) sequence modulation as a method to send the SR.

In Document R1-070379 from the 3GPP TSG RAN WG1 Meeting #47bis held in Sorrento, Italy, Jan. 15-19, 2007, two different ways of generating the SR were considered: a coherent multiplexing scheme and a non-coherent scheme. A coherent multiplexing scheme is similar to the structure that was agreed in Malta to be used for uplink ACK/NACK transmission (3GPP TSG RAN WG1 Meeting #48bis, St. Julian's, Malta, Mar. 26-30, 2007). However we prefer the non-coherent scheme for the SR because of better multiplexing capability. Furthermore, we considered a scheme where only a positive SR is transmitted (i.e., on-off keying).

Regarding to the UE velocity it has been stated in [TR 25.913] that

The E-UTRAN (Enhanced-UTRAN) shall support mobility across the cellular network and should be optimized for low mobile speed from 0 to 15 km/h.

Higher mobile speed between 15 and 120 km/h should be supported with high performance.

Mobility across the cellular network shall be maintained at speeds from 120 km/h to 350 km/h (or even up to 500 km/h depending on the frequency band). For the physical layer parameterization E-UTRAN should be able to maintain the connection up to 350 km/h, or even up to 500 km/h depending on the frequency band.

It seems that the operation area of the highest UE speeds will play quite an important role when standardizing different functions of the LTE system (this was the case e.g., with RACH (Radom Access Channel)). Beside the fact that the highest UE velocities need to be supported, performance differences between various concepts are typically biggest in the extreme operation area, such as the highest UE velocities.

One of the requirements for SR is that it should support a high enough number of simultaneous UEs in order to keep the system overhead caused by SRs small enough. In order to maximize the multiplexing capacity with CAZAC sequence modulation, the spreading factor (SF) of block spreading code is maximized. The preferred SR multiplexing scheme is presented in FIG. 2. The number of parallel SR resources per slot equals to 12*7=84 in the illustrated scheme.

The multiplexing between the different user equipments is achieved through the code domain orthogonality. Cyclic shifts of Zadoff-Chu (ZC) sequences are used as the orthogonal codes. As shown in FIG. 2, the maximum number of orthogonal codes can be computed as 12*7=84. The orthogonality within a single block, or FDMA (Frequency Division Multiple Access) symbol, is limited by the channel delay spread and the sinc pulse shape used in the transceiver. Between the blocks the orthogonality is limited by the channel Doppler spread as well as the frequency error. In practice, the number of orthogonal codes can be less than 84 due to these phenomena.

Figure 3:
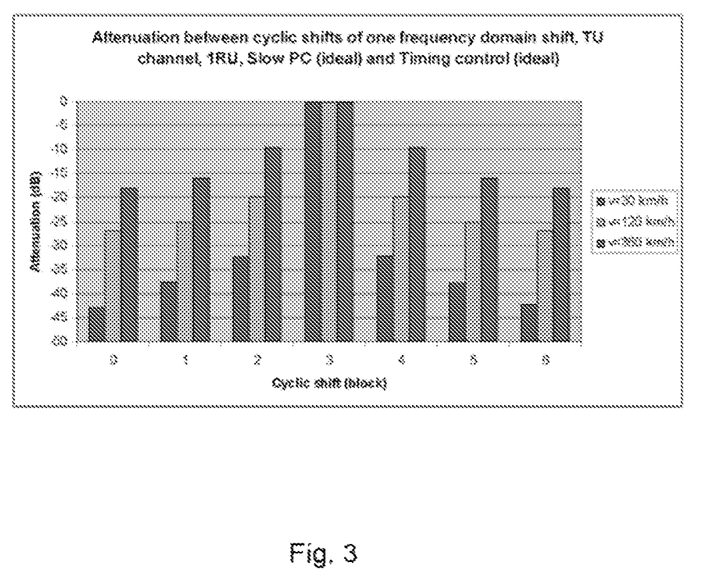
FIG. 3 illustrates attenuation between different cyclic shifts of block level spreading code.

It is noted that there is a problem caused by the SF=7, i.e., that different cyclic shifts of the same block level code start to interfere with each other as the UE speed increases. This means that it is difficult (or even impossible) to provide sufficient performance for 360 km/h case when using an on-off keying-based SR mechanism. This issue is demonstrated in FIG. 3, which shows the attenuation between different cyclic shifts of a certain block level code, for a given cyclic shift of frequency domain CAZAC code.

Related art technique would be to decrease the SF of block level spreading. We note that this approach will Either decrease the multiplexing capacity quite dramatically (e.g., combination of SF=3 and SF=4 would mean that the multiplexing capacity is calculated according to SF=3)

Or decrease the SR coverage by TDM component

SUMMARY

One potential goal is to provide better supporting communication with mobile devices in motion at high speed.

Another potential goal is to provide better support for Scheduling request transmission in an extreme Doppler area.

The inventors propose methods and devices that can be configured into both low Doppler environment and high Doppler environment without additional signaling. In high Doppler environment only codes which are partially orthogonal against each other are taken into use.

The present disclosure shows how to generate sequences having partial orthogonality properties in an LTE type of frame structure and numerology.

Moreover, the present disclosure shows how to use such partial orthogonality properties for improving resistance against Doppler.

Also shown is how to multiplex the new sequence structure.

In one embodiment, the proposed methods and devices use a modified scheduling request scheme shown in FIG. 2 to support high speed UEs. The spreading factor of block spreading is changed to an even number, e.g., from 7 to 6. This enables usage of partial orthogonality properties of CAZAC sequences and as a result inter-code interference in the case of high Doppler is reduced.

As mentioned above, the methods and devices proposed by the inventors may be used in the context of a novel channel structure for E-UTRA, where block spreading and Zadoff-Chu Sequence modulation is applied for the uplink control channel. The inevitable problem of maximizing the multiplexing capacity will lead to numerology causing odd-length sequences, which do not have the favorable property of even-length sequences, which provide partial orthogonality. The consequence of this is catastrophic in terms of performance at high Doppler.

Another embodiment partial orthogonality is carried out by splitting each slot of a block into only two orthogonal sequences. The two orthogonal sequences may comprise a first sequence of three symbols followed by a second sequence of four symbols. Or, as another example, the two orthogonal sequences comprise a first sequence of three symbols preceded and followed by two symbols of the second sequence of four symbols.

In yet another embodiment, partial orthogonality is carried out by using a same slot structure as used for hybrid automatic repeat request feedback signaling.

The proposed methods and devices provide the maximal multiplexing capacity without loss of performance at high Doppler.

Advantages:
  The methods and devices provide a possibility to support an extreme Doppler area (at the expense of reduced multiplexing capacity).
  Additional reduction restores the orthogonality
  No signal loss compared to SF-7 approach (w/o symbol repetition).
  The creation of sequences will maintain the partial orthogonality properties for numerology, which maximizes the multiplexing capacity.
  The methods and devices allow high performance at high Doppler, which is a requirement for the LTE.
  The methods and devices include additional merits of numerology and sequence consistency for the control channel in general. This yields indirect simplifications of sequence signaling and processing in the receiver.

Disadvantages:
  Reduced multiplexing capacity: this can be handled in such that SF is specified to be configurable It is to be understood that all presented exemplary embodiments may also be used in any suitable combination.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

According to the teachings of a first embodiment hereof, a method is shown for arranging block level spreading in such a way that the actual SF in the block domain is constrained to be an even number N (i.e., 6) even though there are N+1 symbols in the original spreading sequence (e.g., 7). In the proposed scheme, the block spreading is performed using a spreading sequence of length N.

Extended sequence of length N+1 blocks is obtained by repetition of a pre-defined block out of N spread blocks
  An outcome of this arrangement is that partial orthogonality which is a property of even-length spreading sequence can be provided for odd number of blocks.

It is noted that orthogonal multiplexing over N+1 symbols has been achieved without degrading the amount of transmitted energy.

The above described scheme will provide improved performance in case of high Doppler (reduced inter-code interference between different block codes). Performance improvement is based on utilization of partial the orthogonality properties of orthogonal sequences (CAZAC, Walsh-Hadamard)

This property is valid for orthogonal sequences of even length
  Cyclic shifts 1:2:N (1, 3, 5) are mutually orthogonal against each other not only over N(6) symbols but also over N/2 (3) symbols. The same applies for cyclic shifts 2:2:N (2, 4, 6).
  Cyclic shifts 1:3:N (1, 4) are orthogonal against each other not only over N (6) symbols but also over N/3 (2) symbols. The same applies for cyclic shifts 2:3:N (2, 5) and 3:3:N (3,6)

Partial orthogonality can be taken into account in the resource allocation in such a way that in extreme conditions (e.g., UE speed of 360 km/h) only codes which are partially orthogonal against each other are taken into use.

Figure 4:
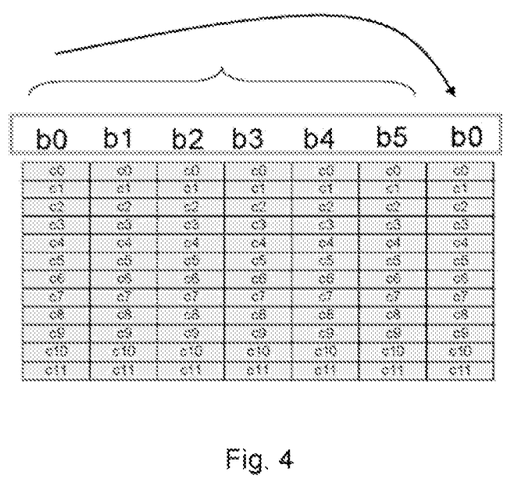
FIG. 4 shows an arrangement according to the proposed methods and devices.

FIG. 4 illustrates a practical arrangement of an embodiment. The CAZAC sequence to be spread is denoted below as C and an even length block spreading code as B.

$$C = [c_0 \, c_1 \ldots c_{11}]^T \quad \quad \quad 5$$

$$B = \lfloor b_0 \, b_1 \ldots b_{(N-1)} \rfloor$$

where N is an even number.

It is possible to take the extension into account directly in the spreading code. Extended block spreading code can then be illustrated as $$B' = \lfloor b_0 \, b_1 \ldots b_{(N-1)} \, b_0 \rfloor$$

It is possible to assign partial orthogonal sequences in high Doppler environment and all sequences in low Doppler environment.

For instance, it is possible to specify two formats for SR and to configure them in a cell-specific way
1. SF=7 for typical environment
2. SF=6+block repetition for high Doppler environment.

Typically more than one resource unit will be allocated for the SR usage in each cell (each resource can have at maximum 42 SR resources). It is possible to configure multiple SR formats in one cell in such that
 UEs with high Doppler are allocated into a certain RU and they would apply SR format #2
 Low speed UEs are allocated different SR resources. They could still utilize SR format #1

This would minimize the degradation caused by slightly smaller multiplexing capacity of SR format #2.

Figure 5:
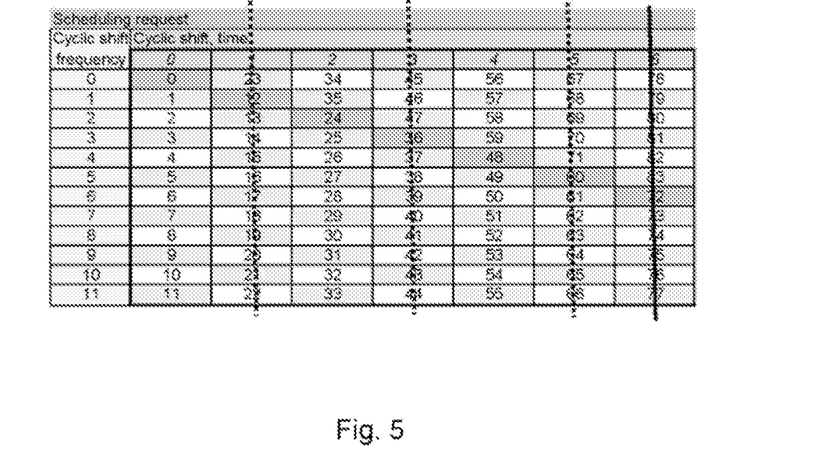
FIG. 5 shows cyclic shift variation, depending on the SR activity.
Figure 6:
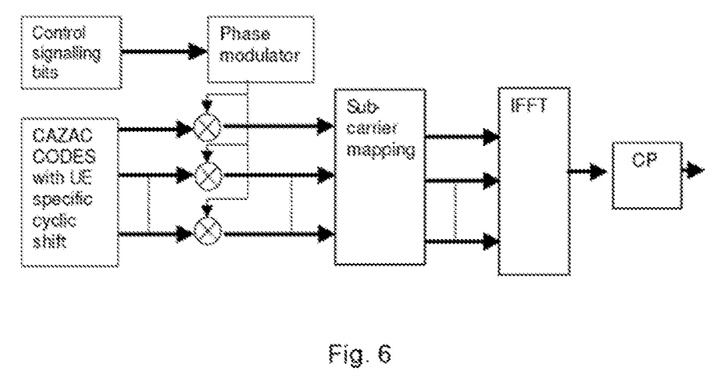
FIG. 6 shows a block diagram of a CAZAC sequence modulator.

According to another embodiment, it is also possible to vary the code allocation in high Doppler mode as shown in FIG. 5:
1. Cyclic shifts 0-6 are used when the SR activity is fairly low
2. Every second cyclic shift is used when the SR activity is higher The partial orthogonality property can be also generated by sequence splitting. As shown in the embodiment of FIG. 6, the length 7 sequence could split into two orthogonal sequences, e.g., length 3 and length 4. The drawback is reduced multiplexing capability because it is determined by shorter sequences. In order to maintain multiplexing capacity, the additional orthogonal cover could apply over the short orthogonal cover sequences resulting in 6 orthogonal sequences. The additional orthogonal cover could switch off in high Doppler conditions. The switching information can be known by eNodeB alone and does not need to be signalled to UEs. Thus no additional signalling is needed.

Figure 7:
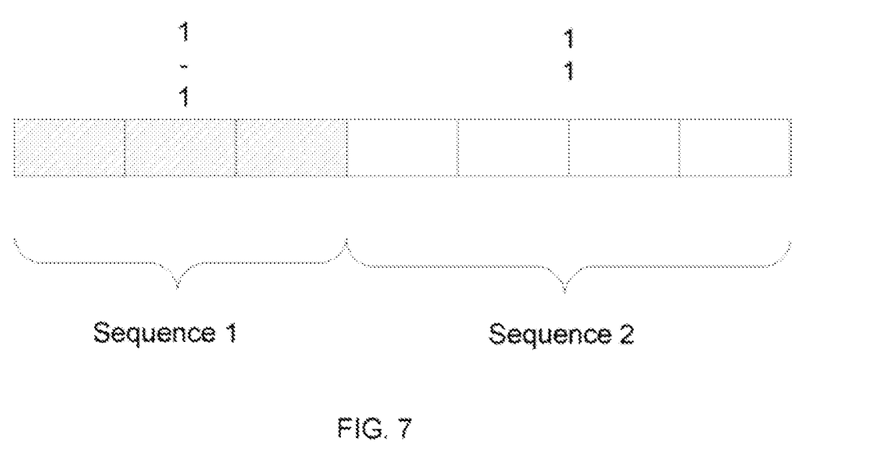
FIG. 7 shows partial orthogonality generated by sequence splitting.

As a further embodiment, as shown in FIG. 7, in order to maximize flexibility of ACK/NACK and SR multiplexing and sequence reuse, the orthogonal cover sequences of SR may be allocated with a structure the same as that used for ACK/NACK, i.e., for HARQ. The drawback is further reduced multiplexing of SR in high Doppler environment; only 2 orthogonal cover codes can be used.

In the case of a positive Scheduling request the cyclically shifted length $N_{ZC}=12$ CAZAC sequence $y(0), \ldots, y(N_{ZC}-1)$ may be block-wise spread with the orthogonal sequence $w(i)$. Assuming $N_{SF}^{PUCCH}=7$, $w(i)$ is defined as the combination of two separate sequences: a cyclically shifted CAZAC sequence $w_i(k)$, $k=0..2$ multiplied with either 1 or −1 depending on channelization code index and a Hadamard sequence $w_2(l), l=0..3$.

Figure 8:
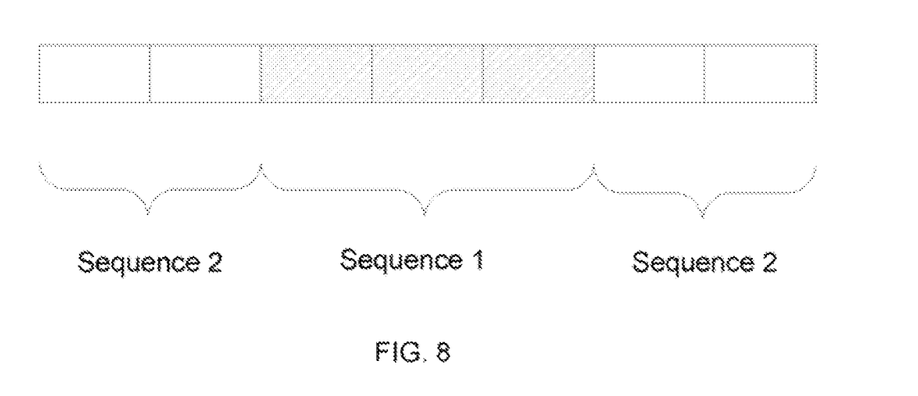
FIG. 8 shows partial orthogonality generated by another way of sequence splitting.

Block-wise spreading is done according to either Method 1 or Method 2:

$$z(m' \cdot N_{symb}^{UL} + m \cdot N_{ZC} + n) = w(m) \cdot y(n) \quad \text{(Method 1)}$$

where
$m = 0, \ldots, N_{SF}^{PUCCH} - 1$
$n = 0, \ldots, N_{ZC} - 1$
$m' = \begin{cases} 0, 1 & \text{for frame structure type 1} \\ 0 & \text{for frame structure type 2} \end{cases}$ and
$w(m) = w_2(m), m = 0, 1;$
$w(m) = w_1(m-2), m = 2, 3, 4;$
$w(m) = w_2(m-3), m = 5, 6$ or $w(m) = w_1(m), m = 0, 1, 2;$ \quad (Method 2)
$w(m) = w_2(m-3), m = 3, 4, 5, 6$ FIG. 8 shows partial orthogonality generated by another way of sequence splitting, i.e., where the two orthogonal sequences comprise a first sequence of three symbols preceded and followed by two symbols of a second sequence of four symbols.

Figure 9:
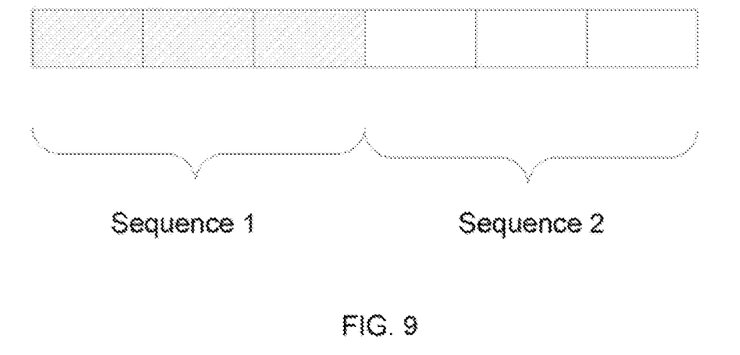
FIG. 9 shows a sub-frame format for a long CP (Cyclic Prefix) with six symbols per slot suitable for FDD.

FIG. 9 shows a sub-frame format for a long CP with six symbols per slot suitable for FDD.

Figure 10:
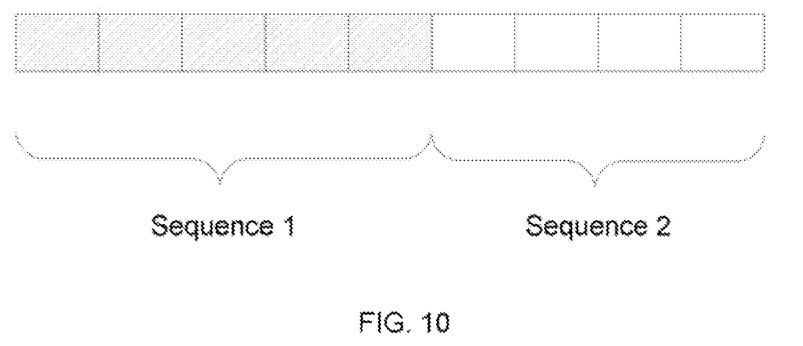
FIG. 10 shows a sub-frame format with a first sequence of five symbols per slot followed by a second sequence of four symbols suitable for TDD.

FIG. 10 shows a sub-frame format with a first sequence of five symbols per slot followed by a second sequence of four symbols suitable for TDD.

Figure 11:
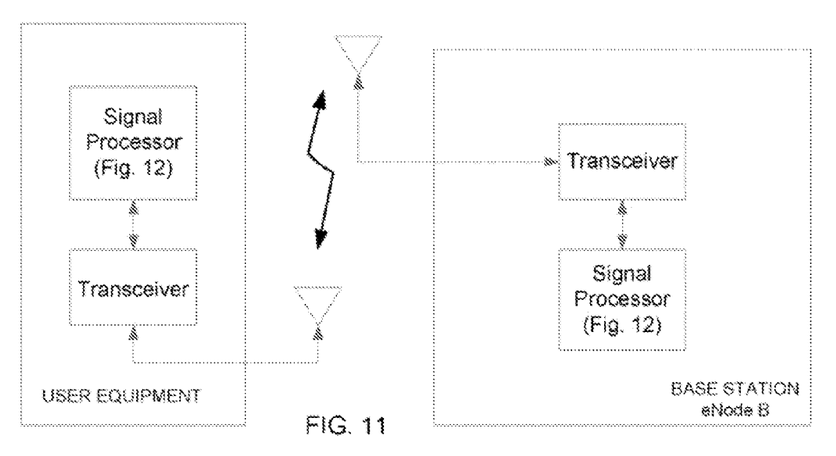
FIG. 11 shows a system, according to one potential embodiment of the inventors' proposals.

FIG. 11 shows a system comprising user equipment and a base station (called "eNode B" in LTE). Both the user equipment and the base station include a transceiver and a signal processor. The signal processors may take various forms including but not limited to the form of processor shown in FIG. 12. Each transceiver is each coupled to an antenna and communications between the user equipment and the base station take place over a wireless interface. The scheduling request channel is an uplink channel within LTE. As such, the eNodeB allocates and signals the code resources to the UEs. When necessary, the eNodeB can use the SR structure in high Doppler format by allocating the code resources to the UEs. The eNodeB will then utilize the SR structure when receiving SRs from the UEs.

The signal processor of the user equipment may take the form shown in FIG. 6 and as such comprises a spreader for block spreading a symbol sequence with spreading codes with partial orthogonality, as exemplified above. The illustrated transceiver of the user equipment of course includes a transmitter for sending one or more scheduling requests block-wise spread with the partial orthogonality.

Figure 12:
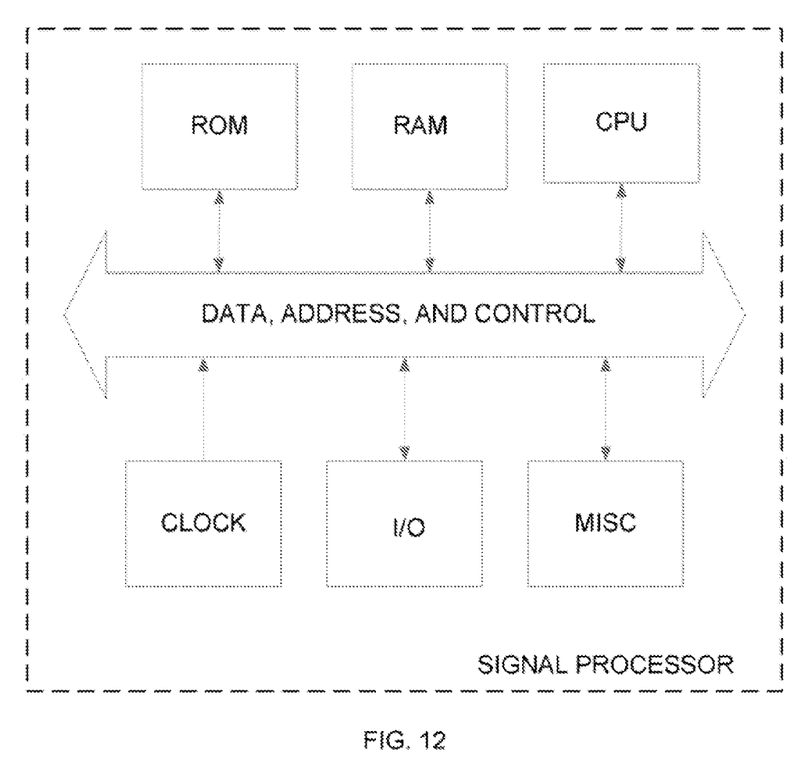
FIG. 12 shows a signal processor suitable for use in the user equipment, in the base station, or both.

The signal processor of the base station may also take the form shown in FIG. 12 and as such comprises a de-spreader for block de-spreading the symbol sequence sent by the UE with partial orthogonality and received by the base station. The illustrated transceiver of the base station of course includes a receiver for receiving the one or more scheduling requests block-wise spread with the partial orthogonality. The signal processor of the base station may take a form similar to that shown in FIG. 6 except in reverse, for carrying out the de-spreading function.

FIG. 12 shows a general purpose signal processor suitable for carrying out the signal processing functions shown above. It includes a read-only-memory (ROM), a random access memory (RAM), a central processing unit (CPU), a clock, an input/output (I/O) port, and miscellaneous functions, all interconnected by a data, address and control (DAC) bus. The ROM is a computer readable medium that is able to store program code written to carry out the various functions described above in conjunction with the RAM, CPU, I/O, etc. Of course, it should be realized that the same signal processing function may be carried out with a combination of hardware and software and may even be carried out entirely in hardware with a dedicated integrated circuit, i.e., without software.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A method of transmitting scheduling requests, comprising:
    block spreading a symbol sequence with spreading codes that result in a partially orthogonal symbol sequence,
    preparing one or more scheduling requests spread block-wise with partial orthogonality, the one or more scheduling requests being prepared from the partially orthogonal symbol sequence, and
    sending the one or more scheduling requests spread block-wise with partial orthogonality, the partial orthogonality being carried out using an even number of spreading factors for the block spreading.

2. The method of claim 1, wherein the block spreading of the symbol sequence supports high speed user equipment to reduce inter-code interference caused by a Doppler effect.

3. The method of claim 1, wherein the symbol sequence is spread with a user equipment specific cyclic shift using constant amplitude zero autocorrelation.

4. The method of claim 1, wherein said partial orthogonality is carried out by splitting each slot of a block into only two orthogonal sequences.

5. The method of claim 4, wherein said two orthogonal sequences include a first sequence of three symbols followed by a second sequence of four symbols.

6. The method of claim 5, wherein said first sequence is a Constant Amplitude Zero Autocorrelation (CAZAC) sequence and said second sequence is a Hadamard sequence.

7. The method of claim 5, wherein both of the first and second sequences are Constant Amplitude Zero Autocorrelation (CAZAC) sequences.

8. The method of claim 4, wherein said two orthogonal sequences included a first sequence of three symbols preceded and followed by two symbols of said second sequence of four symbols.

9. The method of claim 1, wherein said partial orthogonality is carried out by using a same slot structure as used for hybrid automatic repeat request feedback signaling.

10. The method of claim 4, wherein said two orthogonal sequences include a first sequence of three symbols followed by a second sequence of three symbols.

11. The method of claim 4, wherein said two orthogonal sequences include a first sequence of five symbols followed by a second sequence of four symbols.

12. An apparatus, comprising:
    a spreader to perform block spreading of a symbol sequence including one or more scheduling requests, with spreading codes that result in partial orthogonality of the symbol sequence, and
    a transmitter sending the one or more scheduling requests spread block-wise with said partial orthogonality, the partial orthogonality being carried out using an even number of spreading factors for the block spreading.

13. The apparatus of claim 12, wherein the block spreading of the symbol sequence supports high speed user equipment to reduce inter-code interference caused by a Doppler effect.

14. The apparatus of claim 12, wherein the symbol sequence is spread with a user equipment specific cyclic shift using constant amplitude zero autocorrelation.

15. The apparatus of claim 12, wherein said partial orthogonality is carried out by splitting each slot of a block into only two orthogonal sequences.

16. The apparatus of claim 15, wherein said two orthogonal sequences include a first sequence of three symbols followed by a second sequence of four symbols.

17. The apparatus of claim 16, wherein said first sequence is a Constant Amplitude Zero Autocorrelation (CAZAC) sequence and said second sequence is a Hadamard sequence.

18. The apparatus of claim 16, wherein both of the first and second sequences are Constant Amplitude Zero Autocorrelation (CAZAC) sequences.

19. The apparatus of claim 15, wherein said two orthogonal sequences include a first sequence of three symbols preceded and followed by two symbols of said second sequence of four symbols.

20. The apparatus of claim 12, wherein said partial orthogonality is carried out by using a same slot structure as used for hybrid automatic repeat request feedback signaling.

21. The apparatus of claim 15, wherein said two orthogonal sequences include a first sequence of three symbols followed by a second sequence of three symbols.

22. The apparatus of claim 15, wherein said two orthogonal sequences include a first sequence of five symbols followed by a second sequence of four symbols.

23. A method of transmitting scheduling requests, comprising:
    sending a signal to user equipment, the signal being indicative of spreading codes to block spread a symbol sequence including one or more scheduling requests, with the spreading codes resulting in partial orthogonality of the symbol sequence, and
    receiving the one or more scheduling requests spread block-wise with said partial orthogonality, the partial orthogonality being carried out using an even number of spreading factors for the block spreading.

24. The method of claim 23, wherein the block spreading of the symbol sequence supports the high speed user equipment to reduce inter-code interference caused by a Doppler effect.

25. The method of claim 23, wherein the symbol sequence is spread with a user equipment specific cyclic shift using constant amplitude zero autocorrelation.

26. The method of claim 23, wherein said partial orthogonality is carried out by splitting each slot of a block into only two orthogonal sequences.

27. The method of claim 26, wherein said two orthogonal sequences include a first sequence of three symbols followed by a second sequence of four symbols.

28. The method of claim 27, wherein said first sequence is a Constant Amplitude Zero Autocorrelation (CAZAC) sequence and said second sequence is a Hadamard sequence.

29. The method of claim 27, wherein both of the first and second sequences are Constant Amplitude Zero Autocorrelation (CAZAC) sequences.

30. The method of claim 26, wherein said two orthogonal sequences include a first sequence of three symbols preceded and followed by two symbols of said second sequence of four symbols.

31. The method of claim 23, wherein said partial orthogonality is carried out by using a same slot structure as used for hybrid automatic repeat request feedback signaling.

32. The method of claim 26, wherein said two orthogonal sequences include a first sequence of three symbols followed by a second sequence of three symbols.

33. The method of claim 26, wherein said two orthogonal sequences include a first sequence of five symbols followed by a second sequence of four symbols.

34. An apparatus, comprising:
a transmitter sending a signal to user equipment, the signal being indicative of spreading codes to block spread a symbol sequence including one or more scheduling requests, with the spreading codes resulting in partial orthogonality of the symbol sequence, and
a receiver receiving the one or more scheduling requests spread block-wise with said partial orthogonality, the partial orthogonality being carried out using an even number of spreading factors for the block spreading.

35. The apparatus of claim 34, wherein the block spreading of the symbol sequence supports high speed user equipment to reduce inter-code interference caused by a Doppler effect.

36. The apparatus of claim 34, wherein the symbol sequence is spread with a user equipment specific cyclic shift using constant amplitude zero autocorrelation.

37. The apparatus of claim 34, wherein said partial orthogonality is carried out by splitting each slot of a block into only two orthogonal sequences.

38. The apparatus of claim 37, wherein said two orthogonal sequences include a first sequence of three symbols followed by a second sequence of four symbols.

39. The apparatus of claim 38, wherein said first sequence is a Constant Amplitude Zero Autocorrelation (CAZAC) sequence and said second sequence is a Hadamard sequence.

40. The apparatus of claim 38, wherein both of the first and second sequences are Constant Amplitude Zero Autocorrelation (CAZAC) sequences.

41. The apparatus of claim 37, wherein said two orthogonal sequences include a first sequence of three symbols preceded and followed by two symbols of said second sequence of four symbols.

42. The apparatus of claim 34, wherein said partial orthogonality is carried out by using a same slot structure as used for hybrid automatic repeat request feedback signaling.

43. The apparatus of claim 37, wherein an orthogonal cover is applied over the said two orthogonal sequences.

44. The apparatus of claim 43, wherein said orthogonal cover is made by using Hadamard sequences.

45. The apparatus of claim 43, wherein said orthogonal cover is capable of switching off in a high Doppler environment.

46. The apparatus of claim 37, wherein said two orthogonal sequences include a first sequence of three symbols followed by a second sequence of three symbols.

47. The apparatus of claim 37, wherein said two orthogonal sequences include a first sequence of five symbols followed by a second sequence of four symbols.

48. A system, comprising:
a base station, comprising:
a transmitter sending a signal indicative of spreading codes to block spread a symbol sequence including one or more scheduling requests, with the spreading codes resulting in partial orthogonality of the symbol sequence; and
a receiver receiving the one or more scheduling requests spread block-wise with said partial orthogonality; and
a user equipment, comprising:
a receiver receiving said signal from said base station;
a spreader to block spread a symbol sequence including one or more scheduling requests, with spreading codes with partial orthogonality; and
a transmitter sending said one or more scheduling requests block-wise spread by the spreader of the user equipment, with said partial orthogonality,
wherein the partial orthogonality is carried out using an even number of spreading factors for the block spreading.

* * * * *

UNITED STATES PATENT AND TRADEMARK OFFICE
CERTIFICATE OF CORRECTION

PATENT NO. : 8,576,787 B2  Page 1 of 1
APPLICATION NO. : 12/733166
DATED : November 5, 2013
INVENTOR(S) : Hooli et al.

It is certified that error appears in the above-identified patent and that said Letters Patent is hereby corrected as shown below:

In the Claims

In Column 7, Lines 26-28, In Claim 1, delete "the partial orthogonality being carried out using an even number of spreading factors for the block spreading" and insert -- the partial orthogonality being carried out using a spreading factor having an even number for the block spreading --, therefor.

In Column 7, Line 66, and Column 8, Lines 1-2, In Claim 12, delete "the partial orthogonality being carried out using an even number of spreading factors for the block spreading" and insert -- the partial orthogonality being carried out using a spreading factor having an even number for the block spreading --, therefor.

In Column 8, Lines 42-44, In Claim 23, delete "the partial orthogonality being carried out using an even number of spreading factors for the block spreading" and insert -- the partial orthogonality being carried out using a spreading factor having an even number for the block spreading --, therefor.

In Column 9, Lines 17-19, In Claim 34, delete "the partial orthogonality being carried out using an even number of spreading factors for the block spreading" and insert -- the partial orthogonality being carried out using a spreading factor having an even number for the block spreading --, therefor.

In Column 10, Lines 34-36, In Claim 48, delete "the partial orthogonality being carried out using an even number of spreading factors for the block spreading" and insert -- the partial orthogonality being carried out using a spreading factor having an even number for the block spreading --, therefor.

Signed and Sealed this
Nineteenth Day of August, 2014

Michelle K. Lee
*Deputy Director of the United States Patent and Trademark Office*